(12) United States Patent
Zhao

(10) Patent No.: US 9,647,516 B2
(45) Date of Patent: May 9, 2017

(54) FAN DEVICE

(71) Applicant: Wistron Corporation, New Taipei (TW)

(72) Inventor: Min Zhao, New Taipei (TW)

(73) Assignee: Wistron Corp., New Taipei (TW)

( * ) Notice: Subject to any disclaimer, the term of this patent is extended or adjusted under 35 U.S.C. 154(b) by 301 days.

(21) Appl. No.: 14/527,195

(22) Filed: Oct. 29, 2014

(65) Prior Publication Data

US 2016/0065045 A1  Mar. 3, 2016

(30) Foreign Application Priority Data

Aug. 27, 2014  (CN) ...................... 2014 2 0487531 U

(51) Int. Cl.
| | |
|---|---|
| *H02K 3/02* | (2006.01) |
| *H02K 13/02* | (2006.01) |
| *H02K 13/00* | (2006.01) |
| *H01R 39/64* | (2006.01) |
| *H02K 3/18* | (2006.01) |
| *H02K 21/14* | (2006.01) |
| *H02K 3/04* | (2006.01) |
| *H02K 7/14* | (2006.01) |
| *F04D 19/00* | (2006.01) |
| *F04D 25/06* | (2006.01) |
| *F04D 29/38* | (2006.01) |

(52) U.S. Cl.
CPC ........... *H02K 13/02* (2013.01); *H01R 39/643* (2013.01); *H02K 3/04* (2013.01); *H02K 3/18* (2013.01); *H02K 7/14* (2013.01); *H02K 13/003* (2013.01); *H02K 21/14* (2013.01); *F04D 19/002* (2013.01); *F04D 25/0606* (2013.01); *F04D 29/38* (2013.01)

(58) Field of Classification Search
CPC .......... H02K 1/17; H02K 3/18; H02K 13/003; H02K 13/02; H02K 47/04; H01R 39/643
USPC .......... 310/90, 113, 154.01, 219, 232; 416/1
See application file for complete search history.

(56) References Cited

U.S. PATENT DOCUMENTS

| | | | | |
|---|---|---|---|---|
| 1,999,303 | A * | 4/1935 | Sarbey | .................. H02K 13/003 |
| | | | | 192/110 B |
| 4,514,653 | A * | 4/1985 | Batni | ..................... H02K 31/00 |
| | | | | 310/178 |
| 4,720,640 | A * | 1/1988 | Anderson | ............. F03B 13/083 |
| | | | | 290/43 |
| 2016/0065045 | A1* | 3/2016 | Zhao | .................... H02K 13/003 |
| | | | | 310/113 |

* cited by examiner

*Primary Examiner* — John K Kim

(57) ABSTRACT

A fan device includes two magnetic members, a fan and a wire. The fan is disposed between the magnetic members, and includes a rotatable hub and a plurality of fan blades radiating from the hub. The wire is mounted on the fan, and has two electrode ends and a plurality of induction portions that are disposed between the electrode ends. Each induction portion is coupled to a respective fan blade, and is co-rotatable with the respective fan blade to intersect a magnetic field between the magnetic members to thereby generate an induced current that flows toward the electrode ends of the wire.

20 Claims, 4 Drawing Sheets

FAN DEVICE

CROSS-REFERENCE TO RELATED APPLICATION

This application claims priority of Chinese Application No. 201420487531.3, filed on Aug. 27, 2014.

FIELD OF THE DISCLOSURE

The present disclosure relates to a fan device, more particularly to a fan device that has an electricity-generating function.

BACKGROUND OF THE DISCLOSURE

In recent years, electrical devices such as desktops and laptops are frequently used. These electrical devices usually generate heat during operation, which may affect the performance thereof. Therefore, to ensure the normal function of the electrical devices, heat-dissipating modules or components (e.g., cooling fans) are provided to help dissipate the heat.

Currently existing cooling fans dissipate heat by an air stream produced during operation thereof. How to convert the mechanical energy generated from the spinning of the cooling fans into other forms of energy is worth further research.

SUMMARY OF THE DISCLOSURE

Therefore, the object of the present disclosure is to provide a fan device that has an electricity-generating function.

Accordingly, a fan device comprises two spaced-apart magnetic members, a fan and a wire. The magnetic members are arranged such that one side of one of the magnetic members faces one side of the other one of the magnetic members and has a magnetic polarity opposite to that of the one side of the other one of the magnetic members. The magnetic members define a magnetic field therebetween. The fan is disposed between the magnetic members, and includes a rotatable hub and a plurality of angularly spaced-apart fan blades that radiate from the hub. The wire is mounted on the fan, and has two electrode ends and a plurality of induction portions that are disposed between the electrode ends. Each of the induction portions is coupled to a respective one of the fan blades, and is co-rotatable with the respective one of the fan blades to intersect the magnetic field to thereby generate an induced current that flows toward the electrode ends of the wire.

BRIEF DESCRIPTION OF THE DRAWINGS

Other features and advantages of the present disclosure will become apparent in the following detailed description of the embodiment with reference to the accompanying drawings, of which.

DETAILED DESCRIPTION OF THE EMBODIMENT

The following description refers to the accompanying drawings to exemplify a particular embodiment of this disclosure. Languages such as up, upward, down, downward, front, forward, rear, rearward, left, right and the like, are such directions when refer to the accompanying drawing(s), and are not to be taken to limit this disclosure.

Figure 1:
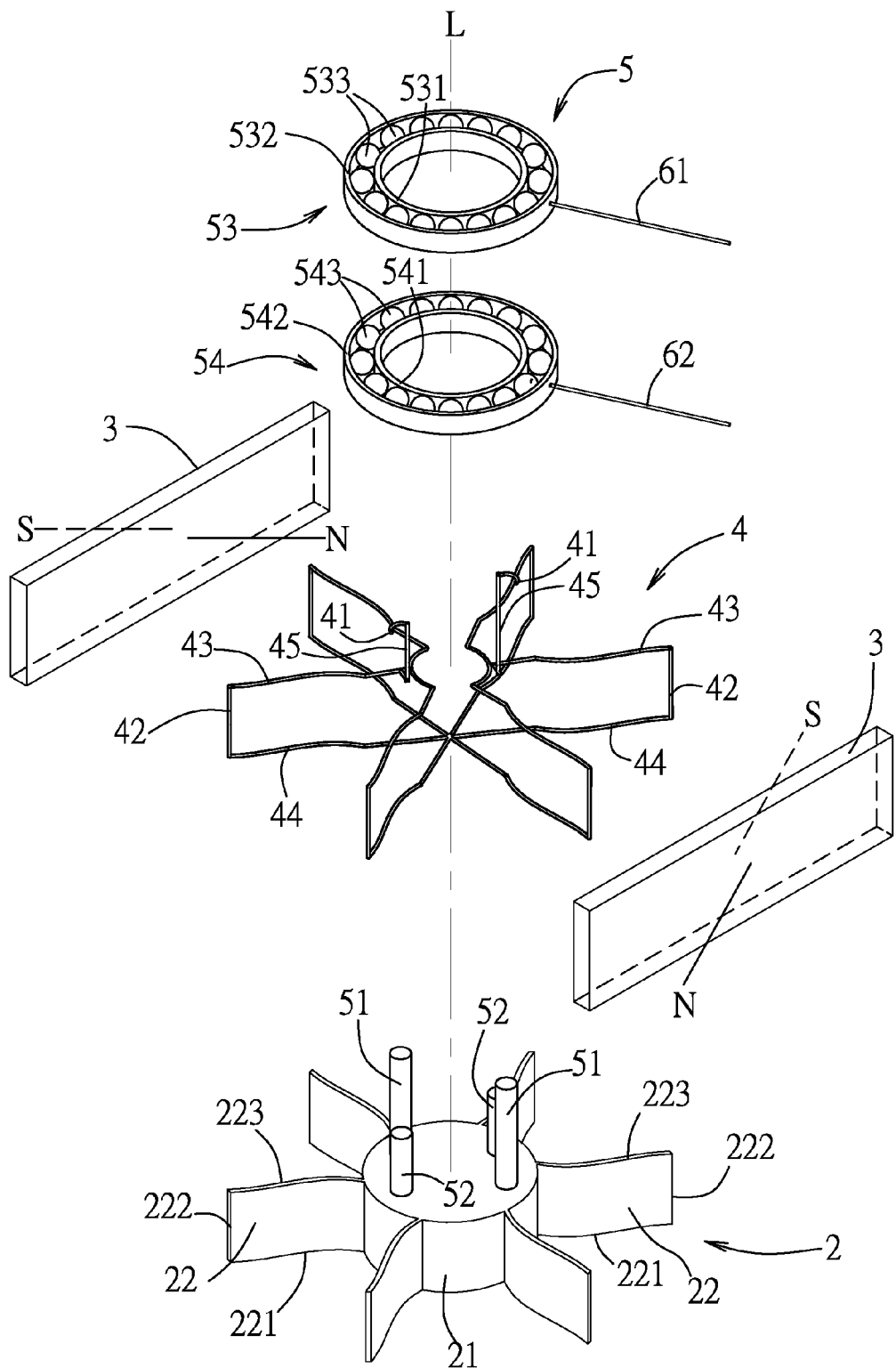
FIG. 1 is an exploded perspective view of an embodiment of a fan device according to the disclosure with a housing being omitted.
Figure 2:
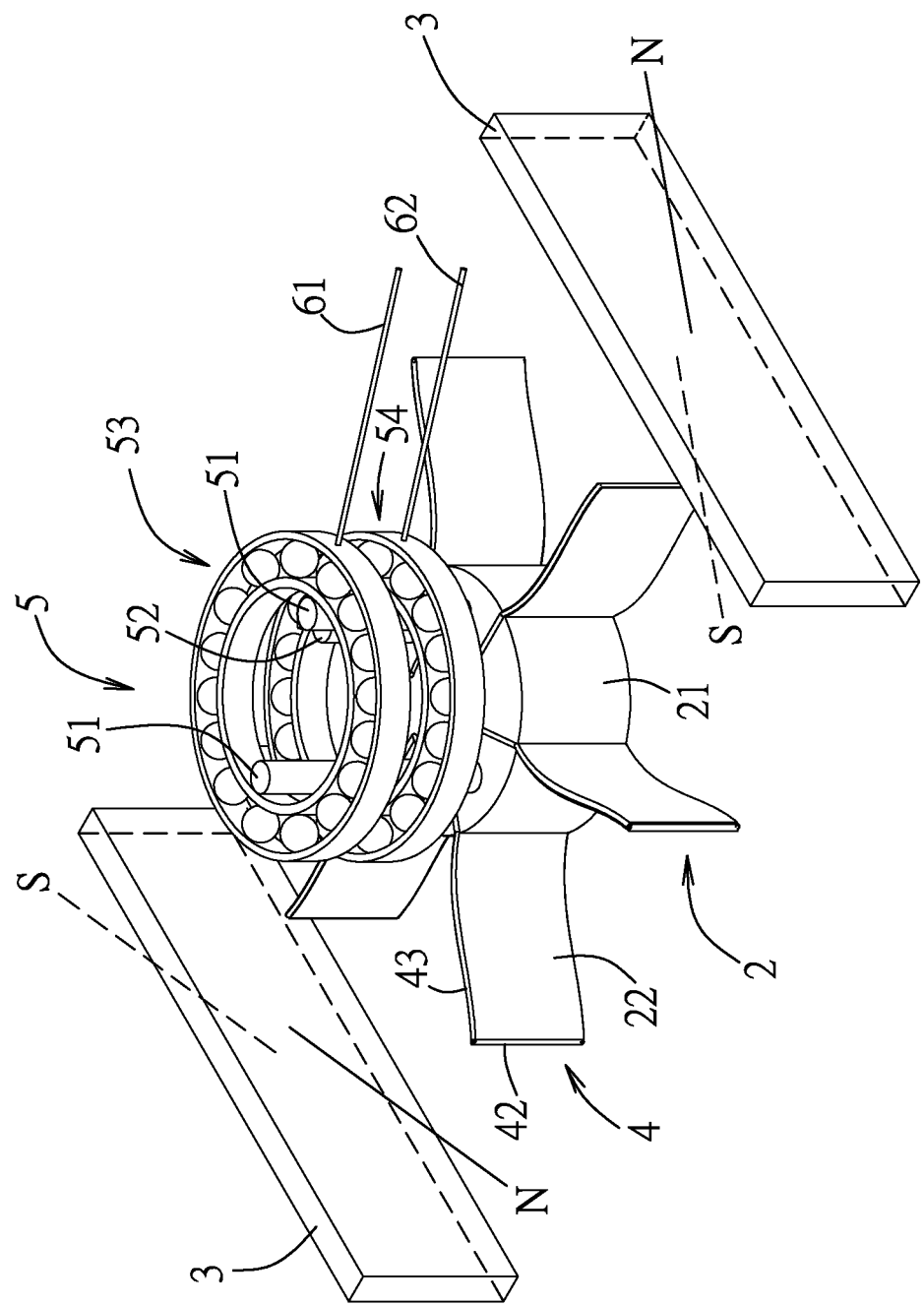
FIG. 2 is an assembled perspective view of the embodiment with the housing being omitted.
Figure 3:
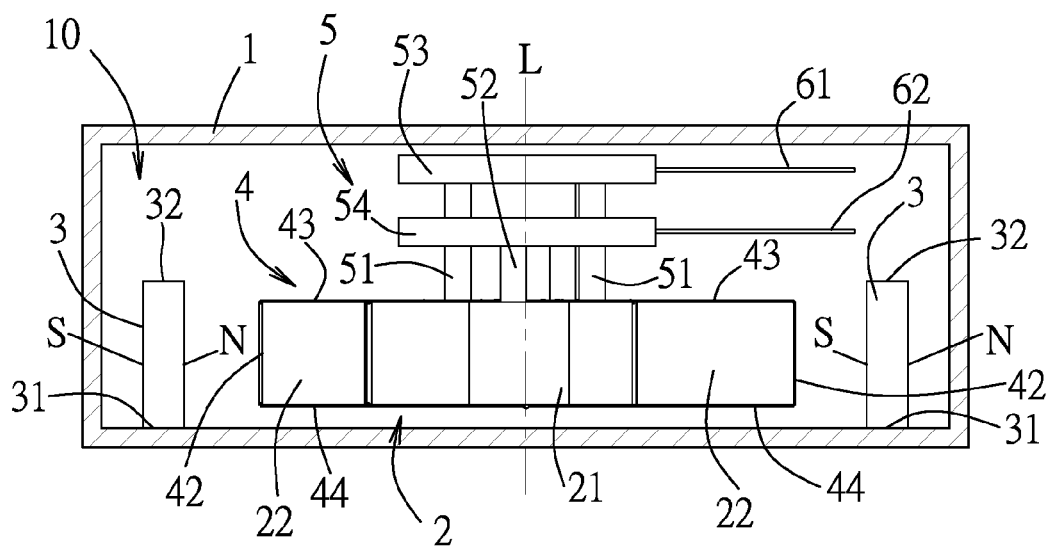
FIG. 3 is a sectional view of the embodiment.

Referring to FIGS. 1 to 3, the embodiment of a fan device according to the present disclosure is adapted for use in laptops, and comprises a housing 1, a fan 2, two magnetic members 3, a wire 4 and a collector mechanism 5.

The housing 1 has an inner surface that defines a receiving space 10 receiving the fan 2, the magnetic members 3, the wire 4 and the collector mechanism 5 therein.

The fan 2 includes a hub 21 and a plurality of fan blades 22. The hub 21 is rotatable about a central axis (L). The fan blades 22 radiate from the periphery of the hub 21 and are angularly spaced apart from one another. Each fan blade 22 has opposite top and bottom edges 223, 221 extending from the hub 21, and a lateral edge 222 interconnecting distal ends of the top and bottom edges 223, 221 which are distal from the central axis (L), such that the top edge 223, the lateral edge 222 and the bottom edge 221 cooperatively form a substantially U-shaped periphery of the fan blade 22.

The magnetic members 3 are arranged in a spaced-apart manner such that one side of one of the magnetic members 3 faces one side of the other one of the magnetic members 3 and has a magnetic polarity opposite to that of the one side of the other one of the magnetic members 3. The fan 2 is disposed between the magnetic members 3. Specifically, the magnetic members 3 are fixedly mounted to the inner surface of the housing 1, with one of the magnetic members 3 having its magnetic south pole facing the fan 2, and the other one of the magnetic members 3 having its magnetic north pole facing the fan 2. The magnetic members 3 define a magnetic field therebetween.

Figure 4:
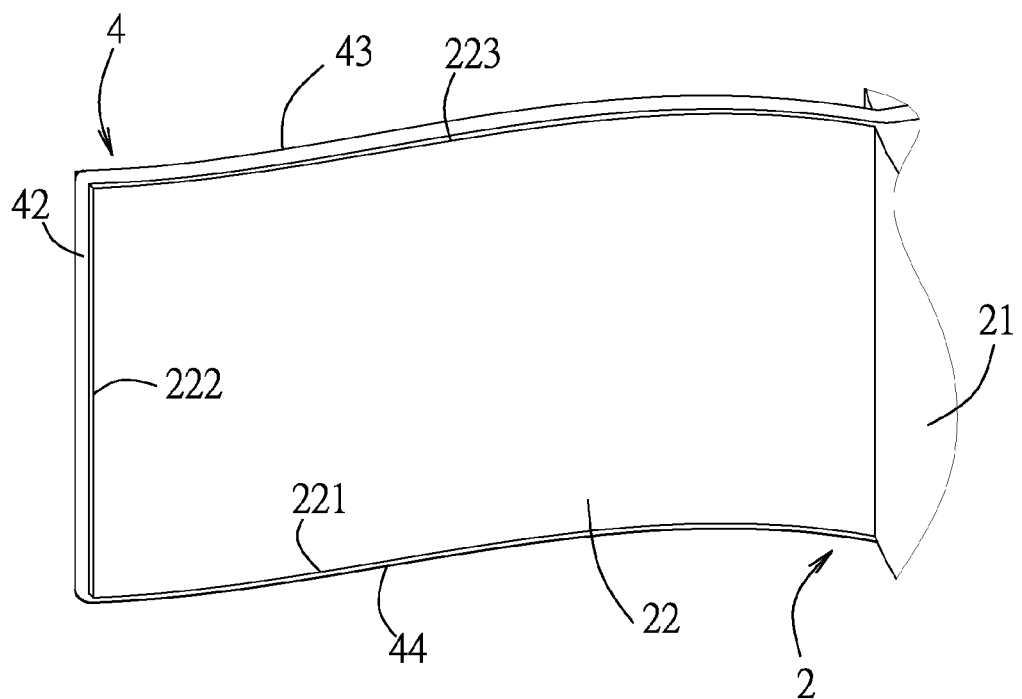
FIG. 4 is a fragmentary enlarged perspective view of a wire coupled to a fan blade.

Referring to FIG. 1 and FIG. 4, the wire 4 is mounted on the fan 2, and has two distal electrode ends 41, a plurality of induction portions 42, a plurality of first transmitting portions 43, a plurality of second transmitting portions 44 and two extending portions 45. In this embodiment, each of the numbers of the induction portions 42, the first transmitting portions 43 and the second transmitting portions 44 is equal to the number of the fan blades 22, but is not limited thereto.

Figure 5:
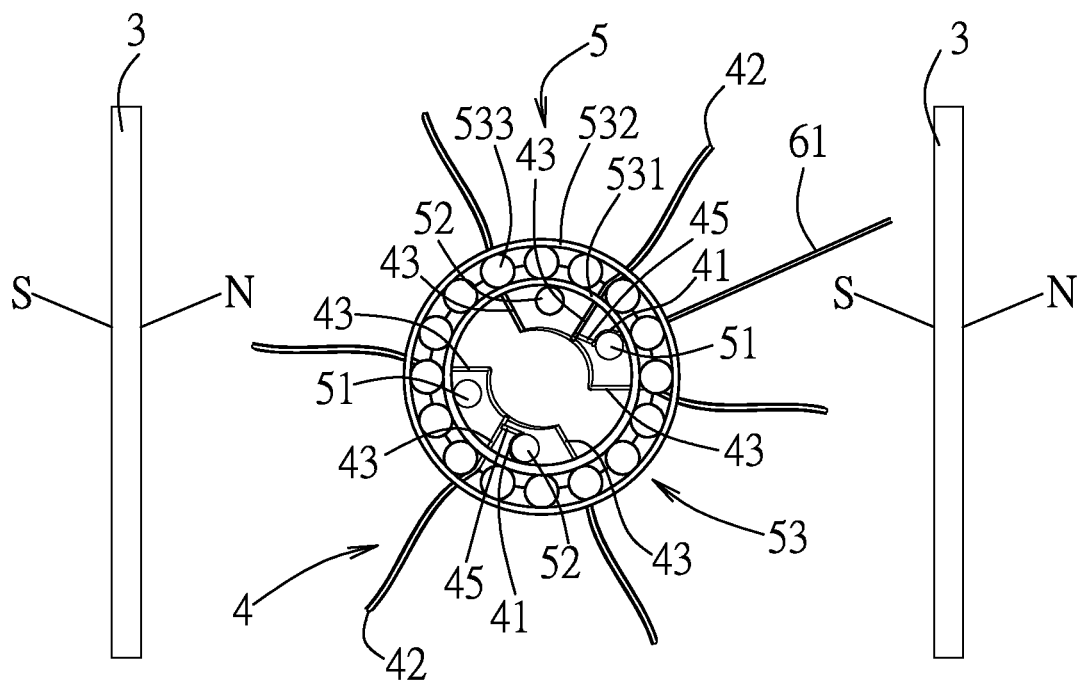
FIG. 5 is a top view of the embodiment with the housing being omitted.

Each of the induction portions 42 is coupled co-rotatably to the lateral edge 222 of a respective one of the fan blades 22, and has one end that is registered with an intersection between the lateral edge 222 and the top edge 223 of the respective one of the fan blades 22, and an opposite end that is registered with an intersection between the lateral edge 222 and the bottom edge 221 of the respective one of the fan blades 22. The induction portions 42 may each be adhered to the lateral edge 222 of the respective one of the fan blades 22. The first transmitting portions 43 are coupled respectively to the top edges 223 of the fan blades 22. The second transmitting portions 44 are coupled respectively to the bottom edges 221 of the fan blades 22. Each of the induction portions 42 is disposed between a respective one of the first transmitting portions 43 and a respective one of the second transmitting portions 44. As such, the wire 4 encloses the peripheries of the fan blades 22. Referring to FIG. 5, the extending portions 45 extend upward from the first transmitting portions 43. The electrode ends 41 of the wire 4 are formed respectively at distal ends of the extending portions 45. Specifically, one of the extending portions 45 extends from one of the three first transmitting portions 43 which are illustrated in the bottom left portion of FIG. 5, and the other one of the extending portions 45 extends from one of the other three first transmitting portions 43 which are illustrated in the top right portion of FIG. 5.

Referring to FIG. 1 and FIG. 3, the collector mechanism 5 includes two first support columns 51, two second support columns 52, a first collector ring 53 and a second collector ring 54. The support columns 51, 52 are made of insulating materials, are mounted on the hub 21 of the fan 2 and extend upward. The length of the first support columns 51 is larger than that of the second support columns 52. The collector rings 53, 54 are made of electrically-conductive metals, and are disposed above the hub 21 of the fan 2 in a spaced-apart manner along the central axis (L) (i.e., the first and second collector rings 53, 54 are disposed at the same side of the hub 21) with the first collector ring 53 being placed over the second collector ring 54. The first support columns 51 are connected to the first collector ring 53, and the second support columns 52 are connected to the second collector ring 54. The first support columns 51 and the second support columns 52 may be hot-melted to the corresponding first and second collector rings 53, 54 or be connected to the corresponding first and second collector rings 53, 54 via a physical coupling mechanism.

Specifically, each one of first and second collector rings 53, 54 is configured as a bearing. The first collector ring 53 has a first inner ring segment 531, a first outer ring segment 532 and a plurality of first rolling elements 533. The first inner ring segment 531 is connected to the first support columns 51. The first outer ring segment 532 surrounds and is spaced apart from the first inner ring segment 531, and is connected fixedly to the housing 1 via a connecting component (not shown). The first rolling elements 533 are rotatably clamped between the first inner ring segment 531 and the first outer ring segment 532, so that the first inner ring segment 531 is rotatable relative to the first outer ring segment 532. The first inner ring segment 531 is electrically connected to one of the electrode ends 41 of the wire 4 for receiving an induced current transmitted from the one of the electrode ends 41. The first outer ring segment 532 is electrically connected to a converting circuit (not shown) through a first outlet line 61. The induced current from the one of the electrode ends 41 flows from the first inner ring segment 531 to the first outer ring segment 532 through the first rolling elements 533, and then flows from the first outer ring segment 532 into the converting circuit. The second collector ring 54 has a second inner ring segment 541, a second outer ring segment 542 and a plurality of second rolling elements 543. The second inner ring segment 541 is connected to the second support columns 52. The second outer ring segment 542 surrounds and is spaced apart from the second inner ring segment 541, and is connected fixedly to the housing 1. The second rolling elements 543 are rotatably clamped between the second inner ring segment 541 and the second outer ring segment 542, so that the second inner ring segment 541 is rotatable relative to the second outer ring segment 542. The second inner ring segment 541 is electrically connected to the other one of the electrode ends 41 of the wire 4 for receiving an induced current transmitted from the other one of the electrode ends 41. The second outer ring segment 542 is electrically connected to the converting circuit through a second outlet line 62. The induced current from the other one of the electrode ends 41 flows from the second inner ring segment 541 to the second outer ring segment 542 through the second rolling elements 543, and then flows from the second outer ring segment 542 into the converting circuit.

The wire 4 is electrically connected to the converting circuit through the first and second collector rings 53, 54 to form a closed circuit. The locations where the induction portions 42 of the wire 4 are disposed on the fan blades 22 may vary as long as the extension of each induction portion 42 is transverse to the magnetic field lines of the magnetic field between the magnetic members 3.

It should be noted that, one of the extending portions 45 of the wire 4 is coupled to one of the first support columns 51, and the other one of the extending portions 45 is coupled to one of the second support columns 52.

The contents below will describe the operation of the embodiment of the fan device.

Referring to FIG. 3 and FIG. 5, when the fan 2 is rotated, each of the induction portions 42 of the wire 4 is carried by the respective one of the fan blades 22 to intersect the magnetic field built by the magnetic members 3 for generating an induced current that flows out of the wire 4 through the electrode ends 41. As shown in FIG. 3, if the left one of the magnetic members 3 is disposed to have its magnetic north pole facing the fan 2, and the right one of the magnetic members 3 is disposed to have its magnetic south pole facing the fan 2, the direction of the magnetic field is from left to right. Viewing from top of the fan device, as shown in FIG. 5, when the fan 2 (see FIG. 1) rotates clockwise, one of the induction portions 42 of the wire 4 approaching the left one of the magnetic members 3 moves upwardly to intersect the magnetic field. It can be determined that the direction of the induced current flowing through the one induction portion 42 is in to the page according to the right-hand rule, or the downward direction as viewed from FIG. 3. Referring once again to FIG. 5, when the fan 2 rotates clockwise, another of the induction portions 42 of the wire 4 approaching the right one of the magnetic members 3 moves downwardly to intersect the magnetic field. It can be determined that the direction of the induced current flowing through said another induction portion 42 is out of the page according to the right-hand rule, or the upward direction as viewed from FIG. 3. As such, a closed circuit is formed. As the fan 2 continues rotating, other induction portions 42 which respectively approach the magnetic members 3 will generate an induced current flowing in the same direction as described above, while the previously mentioned two induction portions 42 generate an induction current flowing in the opposite direction. Such repeated cycle is able to generate an alternating current that is output at the electrode ends 41.

Since the converting circuit is fixed on a motherboard of the laptop, and since the electrode ends 41 of the wire 4 are co-rotatable with the fan 2, the first collector ring 53 and the second collector ring 54 are provided to properly link the electrode ends 41 of the wire 4 and the converting circuit. Specifically, the first collector ring 53 and the second collector ring 54 are all made of electrically-conductive metals, the electrode ends 41 of wire 4 can transmit the induced currents into the first inner ring segment 531 and the second inner ring segment 541 which are co-rotatable with the fan 2, and the induced currents are then transmitted to the first outer ring segment 532 and second outer ring segment 542 through the first rolling elements 533 and the second rolling elements 543, thereby outputting the induced currents into the converting circuit for AC/DC conversion.

Referring to FIG. 3 and FIG. 5, each of the magnetic members 3 is elongated and has a first side 31 and a second side 32. A height of each of the magnetic members 3 in a direction parallel to the central axis (L) between the first side 31 and the second side 32 is larger than that between the bottom edge 221 and the top edge 223 of each fan blade 22 of the fan 2, and the second side 32 of each magnetic members 3 is not higher than a bottom edge of the second collector ring 54. Such configuration can ensure that the fan blades 22 are completely covered by the magnetic field between the magnetic members 3, and that the induction portions 42 can entirely intersect the magnetic field, and also ensure that the second outer ring segment 542 of the second collector ring 54 will not be interfered by the magnetic members 3. Furthermore, a width of each magnetic member 3 is not less than a diameter of the fan 2 so as to maximize the electricity generation when the induction portions 42 intersect the magnetic field.

It is noted that, each of the magnetic members 3 is a permanent magnet in this embodiment, but may as well be other kinds of magnetic components, such as an electromagnet.

To summarize the description above, during the rotation of the fan 2, the induction portions 42 of the wire 4 take turns to intersect the magnetic field between the magnetic members 3 to generate the induced currents that flow out of the wire 4 through the electrode ends 41 to convert the mechanical energy from the rotating fan 2 into electrical energy for storage, thereby achieving the purpose of the present disclosure.

While the present disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A fan device comprising:
   two spaced-apart magnetic members arranged such that one side of one of said magnetic members faces one side of the other one of said magnetic members and has a magnetic polarity opposite to that of said one side of said the other one of said magnetic members, said magnetic members defining a magnetic field therebetween;
   a fan disposed between said magnetic members, and including a rotatable hub and a plurality of angularly spaced-apart fan blades that radiate from said hub; and
   a wire mounted on said fan, and having two distal electrode ends and a plurality of induction portions, each of said induction portions being coupled to a respective one of said fan blades, and being co-rotatable with the respective one of said fan blades to intersect the magnetic field to thereby generate an induced current that flows toward said electrode ends of said wire, wherein:
   said hub of said fan is rotatable about a central axis;
   each of said fan blades has opposite top and bottom edges extending from said hub, and a lateral edge interconnecting distal ends of said top and bottom edges which are distal from the central axis; and
   each of said induction portions of said wire being coupled to said lateral edge of the respective one of said fan blades, and having an end that is registered with an intersection between said lateral edge and said top edge of the respective one of said fan blades, and an opposite end that is registered with an intersection between said lateral edge and said bottom edge of the respective one of said fan blades.

2. The fan device as claimed in claim 1, further comprising a collector mechanism that includes first and second collector rings connected electrically and respectively to said electrode ends of said wire, and that is adapted to be connected electrically to a converting circuit.

3. The fan device as claimed in claim 2, wherein each of said first and second collector rings of said collector mechanism includes an inner ring segment, and an outer ring segment that surrounds and is spaced apart from said inner ring segment and that is adapted to be connected electrically to the converting circuit, said inner ring segment of each of said first and second collector rings being rotatable relative to said outer ring segment and being connected electrically to a respective one of said electrode ends of said wire for receiving the induced current transmitted from the respective one of said electrode ends, the induced current flowing into said inner ring segments of said first and second collector rings and being transmitted to the converting circuit through said outer ring segments.

4. The fan device as claimed in claim 3, wherein each of said first and second collector rings is configured as a bearing.

5. The fan device as claimed in claim 3, wherein said collector mechanism further includes a plurality of support columns mounted on said hub and each connected to said inner ring segment of a corresponding one of said first and second collector rings so that said inner ring segments of said first and second collector rings are co-rotatable with said fan.

6. The fan device as claimed in claim 5, wherein:
   said hub of said fan is rotatable about a central axis; and
   said support columns have different lengths such that said first and second collector rings are arranged along the central axis.

7. The fan device as claimed in claim 6, wherein said first and second collector rings are disposed at the same side of said hub.

8. The fan device as claimed in claim 7, wherein said wire further has a plurality of first transmitting portions coupled respectively to said top edges of said fan blades, and a plurality of second transmitting portions coupled respectively to said bottom edges of said fan blades, each of said induction portions being disposed between a respective one of said first transmitting portions and a respective one of said second transmitting portions.

9. The fan device as claimed in claim 8, wherein said first collector ring is disposed over said second collector ring, said support columns including two first support columns that are connected to said inner ring segment of said first collector ring, and two second support columns that are connected to said inner ring segment of said second collector ring, said wire further having two extending portions that extend from said first transmitting portions, said electrode ends of said wire being formed respectively at distal ends of said extending portions, one of said extending portions being coupled to one of said first support columns, the other one of said extending portions being coupled to one of said second support columns.

10. The fan device as claimed in claim 9, further comprising a housing having an inner surface that defines a receiving space receiving said fan, said wire, said magnetic members and said collector mechanism therein, said magnetic members being fixedly mounted to said inner surface of said housing, said outer ring segments of said first and second collector rings being connected fixedly to said inner surface of said housing.

11. The fan device as claimed in claim 1, wherein each of said magnetic members has a height in a direction parallel to the central axis that is larger than that between said top and bottom edges of each of said fan blades.

12. The fan device as claimed in claim 11, wherein each of said magnetic members has a length in a direction perpendicular to the central axis that is larger than a radial length of said fan.

13. A fan device comprising:
two spaced-apart magnetic members arranged such that one side of one of said magnetic members faces one side of the other one of said magnetic members and has a magnetic polarity opposite to that of said one side of said the other one of said magnetic members, said magnetic members defining a magnetic field therebetween;
a fan disposed between said magnetic members, and including a rotatable hub and a plurality of angularly spaced-apart fan blades that radiate from said hub;
a wire mounted on said fan, and having two distal electrode ends and a plurality of induction portions, each of said induction portions being coupled to a respective one of said fan blades, and being co-rotatable with the respective one of said fan blades to intersect the magnetic field to thereby generate an induced current that flows toward said electrode ends of said wire; and
a collector mechanism that includes first and second collector rings connected electrically and respectively to said electrode ends of said wire, and that is adapted to be connected electrically to a converting circuit;
wherein each of said first and second collector rings of said collector mechanism includes an inner ring segment, and an outer ring segment that surrounds and is spaced apart from said inner ring segment and that is adapted to be connected electrically to the converting circuit, said inner ring segment of each of said first and second collector rings being rotatable relative to said outer ring segment and being connected electrically to a respective one of said electrode ends of said wire for receiving the induced current transmitted from the respective one of said electrode ends, the induced current flowing into said inner ring segments of said first and second collector rings and being transmitted to the converting circuit through said outer ring segments; and
wherein said collector mechanism further includes a plurality of support columns mounted on said hub and each connected to said inner ring segment of a corresponding one of said first and second collector rings so that said inner ring segments of said first and second collector rings are co-rotatable with said fan.

14. The fan device as claimed in claim 13, wherein:
said hub of said fan is rotatable about a central axis; and
said support columns have different lengths such that said first and second collector rings are arranged along the central axis.

15. The fan device as claimed in claim 14, wherein said first and second collector rings are disposed at the same side of said hub.

16. The fan device as claimed in claim 15, wherein said wire further has a plurality of first transmitting portions coupled respectively to said top edges of said fan blades, and a plurality of second transmitting portions coupled respectively to said bottom edges of said fan blades, each of said induction portions being disposed between a respective one of said first transmitting portions and a respective one of said second transmitting portions.

17. The fan device as claimed in claim 16, wherein said first collector ring is disposed over said second collector ring, said support columns including two first support columns that are connected to said inner ring segment of said first collector ring, and two second support columns that are connected to said inner ring segment of said second collector ring, said wire further having two extending portions that extend from said first transmitting portions, said electrode ends of said wire being formed respectively at distal ends of said extending portions, one of said extending portions being coupled to one of said first support columns, the other one of said extending portions being coupled to one of said second support columns.

18. The fan device as claimed in claim 17, further comprising a housing having an inner surface that defines a receiving space receiving said fan, said wire, said magnetic members and said collector mechanism therein, said magnetic members being fixedly mounted to said inner surface of said housing, said outer ring segments of said first and second collector rings being connected fixedly to said inner surface of said housing.

19. The fan device as claimed in claim 13, wherein each of said magnetic members has a height in a direction parallel to the central axis that is larger than that between said top and bottom edges of each of said fan blades.

20. The fan device as claimed in claim 19, wherein each of said magnetic members has a length in a direction perpendicular to the central axis that is larger than a radial length of said fan.

\* \* \* \* \*